United States Patent
Haque et al.

(10) Patent No.: US 7,761,721 B2
(45) Date of Patent: Jul. 20, 2010

(54) SYSTEM OF INTEGRATED ENVIRONMENTALLY HARDENED ARCHITECTURE FOR SPACE APPLICATION

(75) Inventors: Jamal Haque, Tampa, FL (US); Andrew W. Guyette, Clearwater, FL (US); Edward R. Prado, Palm Harbor, FL (US); Keith A. Souders, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 768 days.

(21) Appl. No.: 11/734,482

(22) Filed: Apr. 12, 2007

(65) Prior Publication Data

US 2008/0256375 A1     Oct. 16, 2008

(51) Int. Cl.
G06F 1/00 (2006.01)
G01C 23/00 (2006.01)
G21K 1/00 (2006.01)
G21F 1/00 (2006.01)

(52) U.S. Cl. .................. 713/300; 701/3; 250/505.1; 250/515.1

(58) Field of Classification Search .......... 713/300; 250/505.1, 515.1; 701/3
See application file for complete search history.

(56) References Cited

U.S. PATENT DOCUMENTS

| 4,413,327 | A | 11/1983 | Sabo et al. |
| 5,317,441 | A | 5/1994 | Sidman |
| 5,786,975 | A | 7/1998 | Duncan et al. |
| 6,141,770 | A | 10/2000 | Fuchs et al. |
| 6,330,627 | B1 | 12/2001 | Toda |
| 6,388,259 | B1 * | 5/2002 | Murdock ............... 250/370.01 |
| 6,401,159 | B1 | 6/2002 | Wang |
| 6,424,177 | B1 | 7/2002 | Hairapetian |
| 6,526,559 | B2 * | 2/2003 | Schiefele et al. ............. 716/16 |
| 7,260,742 | B2 | 8/2007 | Czajkowski |
| 7,343,579 | B2 | 3/2008 | Coxe et al. |
| 7,428,473 | B2 | 9/2008 | Rodriguez et al. |
| 7,685,464 | B2 * | 3/2010 | Kimmery et al. ............. 714/13 |
| 2006/0020774 | A1 | 1/2006 | Ramos et al. |
| 2006/0145722 | A1 | 7/2006 | Plants |
| 2007/0022318 | A1 | 1/2007 | Copenhaver et al. |
| 2008/0022152 | A1 * | 1/2008 | Lupia et al. .................. 714/20 |
| 2008/0256375 | A1 | 10/2008 | Haque et al. |

OTHER PUBLICATIONS

Ramos et al, "Environmentally adaptive fault tolerant computing (EAFTC)", Mar. 2005, Publisher: 2005 IEEE Aerospace Conference.

* cited by examiner

*Primary Examiner*—Ji H Bae
(74) *Attorney, Agent, or Firm*—Fogg & Powers LLC

(57) ABSTRACT

An environmentally hardened architecture comprises a hybrid processor, a high speed bus having environmentally-sensitive interfaces, an environmentally hardened bus having environmentally-hardened interfaces, and an environmentally-hardened processor communicatively coupled to an environmentally-sensitive interface of the high speed bus and communicatively coupled to an environmentally-hardened interface of the environmentally hardened bus. The hybrid processor includes an environmentally-hardened processing section and an environmentally-sensitive processing section. At least one environmentally-sensitive interface is configured to pass data to and from the environmentally-sensitive processing section and another environmentally-sensitive interface is configured to pass data to and from the environmentally-hardened processing section of the hybrid processor. An environmentally-hardened interface is configured to pass data to and from the environmentally-hardened processing section of the hybrid processor. The environmentally-hardened processor processes critical applications in the environmentally-hardened processing section of the at least one hybrid processor during an environmental event.

20 Claims, 7 Drawing Sheets

SYSTEM OF INTEGRATED ENVIRONMENTALLY HARDENED ARCHITECTURE FOR SPACE APPLICATION

This application is related to U.S. patent application Ser. No. 11/672,068 having a title of "A SYSTEM OF CIRCUMVENTION AND RECOVERY IN A MULTI-FUNCTION SYSTEM" (also referred to here as the "'068 application"), U.S. patent application Ser. No. 11/672,065 having a title of "A METHOD OF PERIPHERAL TYPE IDENTIFICATION IN A SYSTEM OF CIRCUMVENTION AND RECOVERY" (also referred to here as the "'065 application"), U.S. patent application Ser. No. 11/672,056 having a title of "A METHOD FOR IMPLEMENTING A CONTROL CHANNEL IN A SYSTEM OF CIRCUMVENTION AND RECOVERY" (also referred to here as the "'056 application"), and U.S. patent application Ser. No. 11/672,061 having a title of "HEALTH MONITORING IN A SYSTEM OF CIRCUMVENTION AND RECOVERY" (also referred to here as the "'061 application") all of which are filed on the same Feb. 7, 2007. The '068 Application, the '065 Application, the '056 Application, and the '061 Application are hereby incorporated herein by reference.

BACKGROUND

Mission application systems that use commercially off the shelf components (COTS) are prone to failure when they experience hostile environments. For example, the performance of a typical COTS processor that is exposed to certain levels of radiation will suffer. To accommodate for the effects of radiation, radiation hardened processors have been developed. The performance of these types of processors is not affected by the radiation. However, radiation hardened processors have their limitations. For example, they tend to be very expensive and they do not perform at a level that can be used in all applications. The lack of performance of radiation hardened processors is especially crucial in mission application systems designed to travel in space where the speed of processing is an issue.

For the reasons stated above and for other reasons stated below which will become apparent to those skilled in the art upon reading and understanding the present specification, there is a need in the art for a system that effectively deals with hostile environments without sacrificing necessary performance to complete a mission.

SUMMARY

In a first embodiment an environmentally hardened architecture is provided. The environmentally hardened architecture comprises a hybrid processor, a high speed bus having environmentally-sensitive interfaces, an environmentally hardened bus having environmentally-hardened interfaces, and an environmentally-hardened processor communicatively coupled to an environmentally-sensitive interface of the high speed bus and communicatively coupled to an environmentally-hardened interface of the environmentally hardened bus. The hybrid processor includes an environmentally-hardened processing section and an environmentally-sensitive processing section. At least one environmentally-sensitive interface is configured to pass data to and from the environmentally-sensitive processing section and another environmentally-sensitive interface is configured to pass data to and from the environmentally-hardened processing section of the hybrid processor. An environmentally-hardened interface is configured to pass data to and from the environmentally-hardened processing section of the at least one hybrid processor. The environmentally-hardened processor processes critical applications in the environmentally-hardened processing section of the at least one hybrid processor during an environmental event.

DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a multi-function system, such as a flight computer, that implements an environmentally hardened architecture. The multifunction system detects disruptive events and employs an environmentally hardened bus during the environmental events. The multifunction system employs a high speed bus, typically COTS-based high speed bus, during normal conditions.

Figure 1:
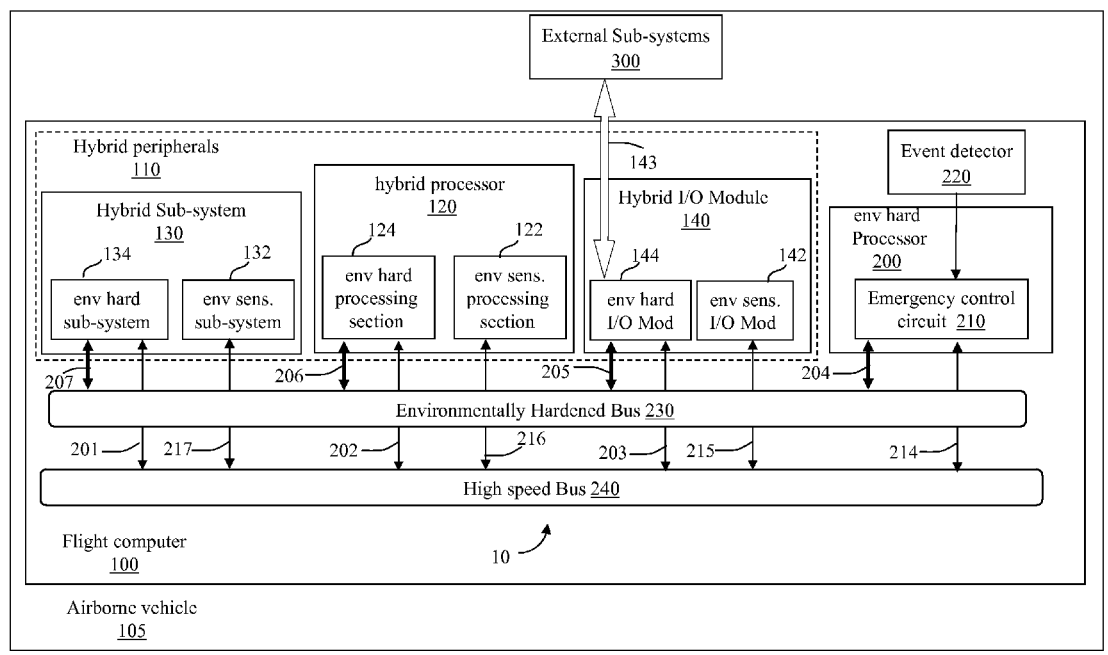
FIGS. 1-4 are block diagrams of embodiments of flight computers having environmentally hardened architectures.

Referring to FIG. 1, an environmentally hardened architecture 10 comprises hybrid peripherals 110, an environmentally hardened bus 230, a high speed bus 240, at least one event detector 220, and an environmentally-hardened (env hard) processor 200. In the exemplary embodiment shown in FIG. 1, the environmentally hardened architecture 10 is implemented in a flight computer 100 of an airborne vehicle 105. The high speed bus 240 includes environmentally-sensitive interfaces 201-203 and 214-217. The environmentally hardened bus 230 includes environmentally-hardened interfaces 204-207. The environmentally-hardened processor 200 includes an emergency-control circuit 210.

The hybrid peripherals 110 include at least one hybrid sub-system 130, at least one hybrid processor 120, and at least one hybrid input/output (I/O) module 140. Each of the hybrid processors 120 includes an environmentally-hardened processing section 124 and an environmentally-sensitive (env sens.) processing section 122. The high speed bus 240 includes at least one environmentally-sensitive interface 216 that is configured to pass data to and from the environmentally-sensitive processing section 122 of each hybrid processor 120. The high speed bus 240 also includes at least one environmentally-sensitive interface 202 that is configured to pass data to and from the environmentally-hardened processing section 124 of each hybrid processor 120. The environmentally hardened bus 230 includes at least one environmentally-hardened interface 206 is configured to pass data to and from the environmentally-hardened processing section 124 of the each hybrid processor 120.

Each of the hybrid sub-systems 130 includes an environmentally-hardened sub-system 134 and an environmentally-sensitive sub-system 132. The high speed bus 240 includes at least one environmentally-sensitive interface 217 that is configured to pass data to and from the at least one environmentally-sensitive sub-system 132. The high speed bus 240 also includes at least one environmentally-sensitive interface 201 that is configured to pass data to and from the at least one environmentally-hardened sub-system 134. The environmentally hardened bus 230 further comprises at least one environmentally-hardened interface 207 that is configured to pass data to and from the environmentally-hardened sub-system 134.

Each of the hybrid input/output modules 140 includes an environmentally-hardened input/output module 144 and an environmentally-sensitive input/output module 142. Each of the environmentally-hardened input/output modules 144 is communicatively coupled to external sub-systems 300 via interface 143. The high speed bus 240 includes at least one environmentally-sensitive interface 215 that is configured to pass data to and from the at least one environmentally-sensitive input/output module 142. The high speed bus 240 also includes at least one environmentally-sensitive interface 203 that is configured to pass data to and from the at least one environmentally-hardened input/output module 144. The environmentally hardened bus 230 includes at least one environmentally-hardened interface 205 that is configured to pass data to and from the environmentally-hardened input/output module 144.

The environmentally-hardened processor 200 is communicatively coupled to at least one environmentally-sensitive interface 214 of the high speed bus 240 and is communicatively coupled to at least one environmentally-hardened interface 204 of the environmentally hardened bus 230. During an environmental event, the environmentally-hardened processor 200 processes critical applications in the environmentally-hardened input/output module 144 of the at least one hybrid input/output module 140, in the environmentally-hardened sub-system 134 of the hybrid sub-system 130, and in the environmentally-hardened processing section 124 of the hybrid processor 120.

During normal operation of the environmentally hardened architecture 10, signals including information indicative of controls, reads, and writes are transmitted via the high speed bus 240 between the hybrid peripherals 110. For example, during normal operation of the environmentally hardened architecture 10, signals including information indicative of controls, reads, and writes are transmitted via the high speed bus 240 among the hybrid sub-system 130, the hybrid processor 120, the hybrid input/output module 140 and the environmentally-hardened processor 200.

The event detector 220 detects environmental events and sends information indicative of an environmental event to the environmentally-hardened processor 200. The emergency-control circuit 210 in the environmentally-hardened processor 200 receives an emergency-control signal from the environmentally-hardened processor 200 when an environmental event is detected. Responsive to receiving the emergency-control signal, the emergency-control circuit 210 controls the environmentally-sensitive input/output module 142 in the hybrid input/output module 140, the environmentally-sensitive sub-system 132 in the hybrid sub-system 130, and the environmentally-sensitive processing section 122 in the hybrid processor 120.

In one implementation of this embodiment, the emergency-control circuit 210 reduces power to at least a portion of one or more of the environmentally-sensitive input/output module 142 in the hybrid input/output module 140, at least a portion of the environmentally-sensitive sub-system 132 in the hybrid sub-system 130, and at least a portion of the environmentally-sensitive processing section 122 in the hybrid processor 120. In another implementation of this embodiment, the emergency-control circuit 210 shuts down at least a portion of the environmentally-sensitive input/output module 142 in the hybrid input/output module 140, at least a portion of the environmentally-sensitive sub-system 132 in the hybrid sub-system 130, and at least a portion of the environmentally-sensitive processing section 122 in the hybrid processor 120. In yet another implementation of this embodiment, the emergency-control circuit 210 shuts down and/or reducing power to at least one portion of the environmentally-sensitive input/output module 142 in the hybrid input/output module 140, at least a portion of the environmentally-sensitive sub-system 132 in the hybrid sub-system 130, and at least a portion of the environmentally-sensitive processing section 122 in the hybrid processor 120.

In one implementation of this embodiment, the environmentally hardened architecture including at least one hybrid processor 120, the at least one hybrid input/output module 140, and at least one hybrid sub-system 130 is implemented in a multi-function system that is not located in an airborne vehicle.

In another implementation of this embodiment, at least one of the hybrid input/output modules 140, the hybrid sub-systems 130, and the hybrid processors 120 are integrated with at least one of another of the hybrid input/output modules 140, the hybrid sub-systems 130, and the hybrid processors 120. In one exemplary case, the hybrid processor 120 includes a hybrid sub-system 130. In another exemplary case, the hybrid processor 120 includes a hybrid sub-system 130 and a hybrid input/output module 140. In yet another exemplary case, the hybrid sub-system 130 includes a hybrid input/output module 140. In yet another exemplary case, the hybrid sub-system 130 includes a hybrid input/output module 140 and a hybrid processor 120. Other integrated combinations of the one hybrid input/output module 140, the at least one hybrid sub-system 130, and the at least one hybrid processor 120 are possible.

In yet another implementation of this embodiment, the environmental event is a radiation event. In this case, the event detector 220 is a radiation detector and the environmentally hardened sections are radiation hardened, while environmentally sensitive sections are radiation sensitive sections. In yet another implementation of this embodiment, the high speed bus 240 is a COTS-based bus.

Figure 2:
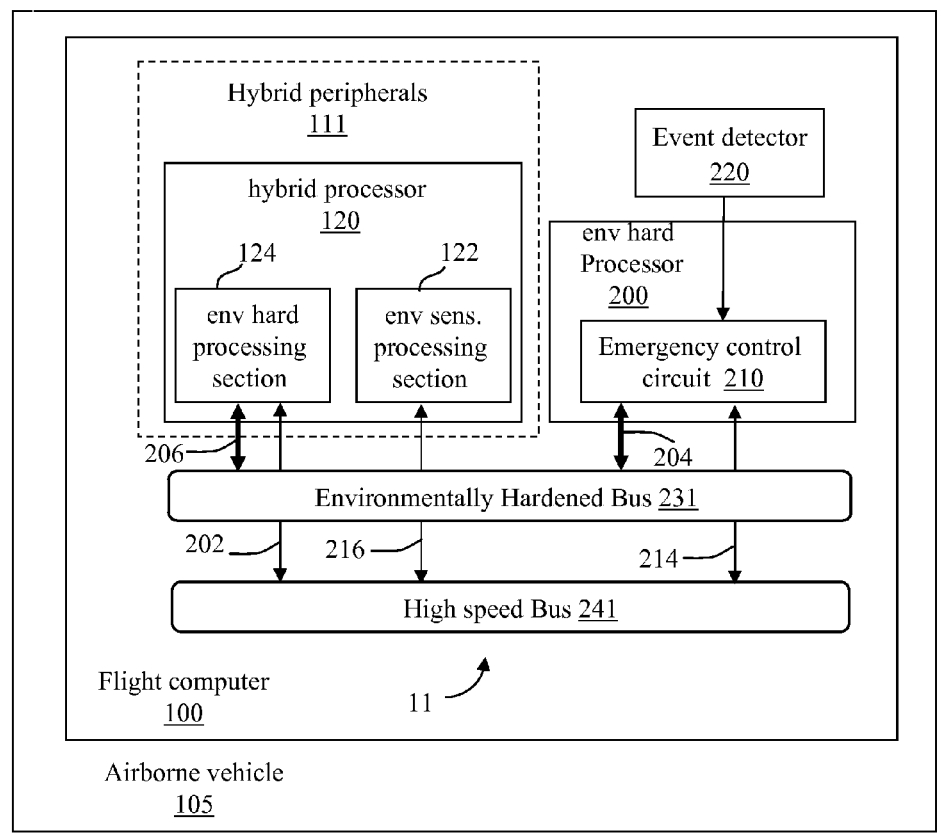

Referring to FIG. 2, an environmentally hardened architecture 11 comprises hybrid peripherals 111, an environmentally hardened bus 231, a high speed bus 241, at least one event detector 220, and the environmentally-hardened processor 200. In the exemplary embodiment shown in FIG. 2, the hybrid peripherals 111 include at least one hybrid processor 120. The environmentally hardened architecture 11 is implemented in a flight computer 100 of an airborne vehicle 105.

The high speed bus 241 includes environmentally-sensitive interfaces 202, 214 and 216. The environmentally hardened bus 231 includes environmentally-hardened interfaces 206 and 204. The environmentally hardened bus 231 and the high speed bus 241 function in a manner similar to the environmentally hardened bus 230 and the high speed bus 240, respectively, as described above with reference to FIG. 1. The environmentally-hardened processor 200, the environmentally-sensitive interfaces 202, 214 and 216, and the environmentally-hardened interfaces 204 and 206 function as described above with reference to FIG. 1.

In implementations of this embodiment, the hybrid processor 120 includes one or more hybrid sub-systems and/or one or more hybrid input/output modules.

Figure 3:
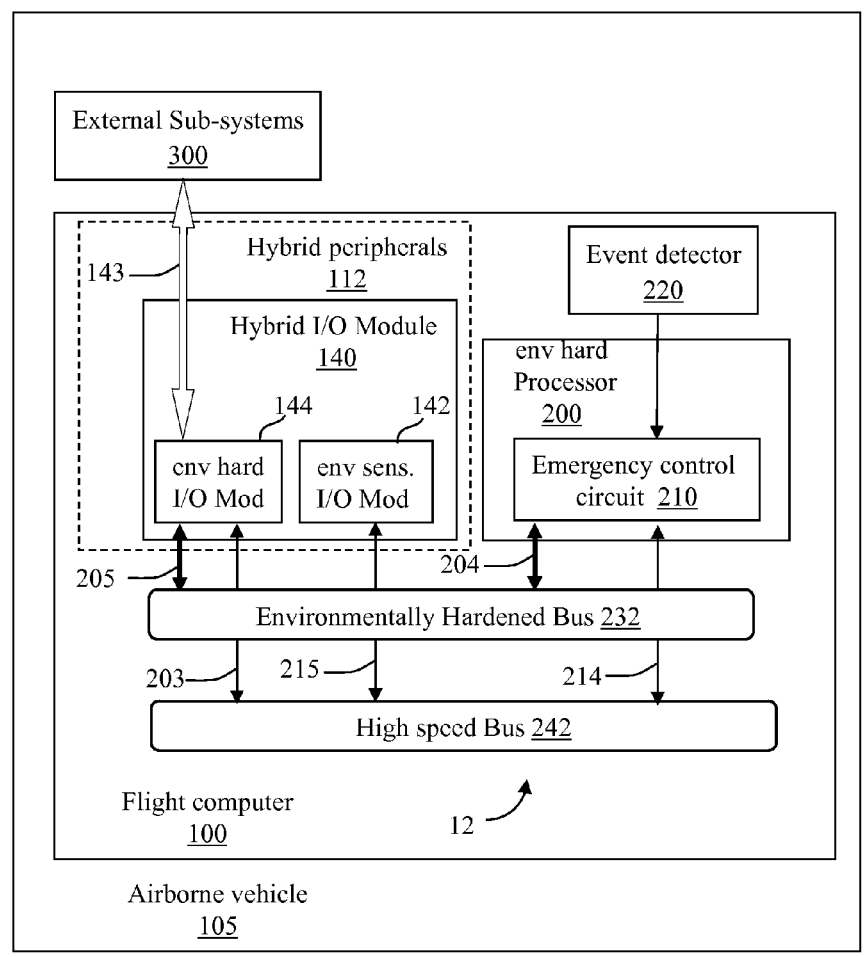

Referring to FIG. 3, an environmentally hardened architecture 12 comprises hybrid peripherals 112, an environmentally hardened bus 232, a high speed bus 242, at least one event detector 220, and the environmentally-hardened processor 200. In the exemplary embodiment shown in FIG. 3, the hybrid peripherals 112 include at least one hybrid input/output module 140. Each of the environmentally-hardened input/output modules 144 is communicatively coupled to external sub-systems 300 via interface 143. The environmentally hardened architecture 12 is implemented in a flight computer 100 of an airborne vehicle 105.

The high speed bus 242 includes environmentally-sensitive interfaces 203, 214 and 215. The environmentally hardened bus 232 includes environmentally-hardened interfaces 204 and 205. The environmentally hardened bus 232 and the high speed bus 242 function in a manner similar to the environmentally hardened bus 230 and the high speed bus 240, respectively, as described above with reference to FIG. 1. The environmentally-hardened processor 200, the environmentally-sensitive interfaces 203, 214 and 215, and the environmentally-hardened interfaces 204 and 205 function as described above with reference to FIG. 1.

In implementations of this embodiment, the hybrid input/output module 140 includes one or more hybrid processors and/or one or more hybrid sub-systems.

Figure 4:
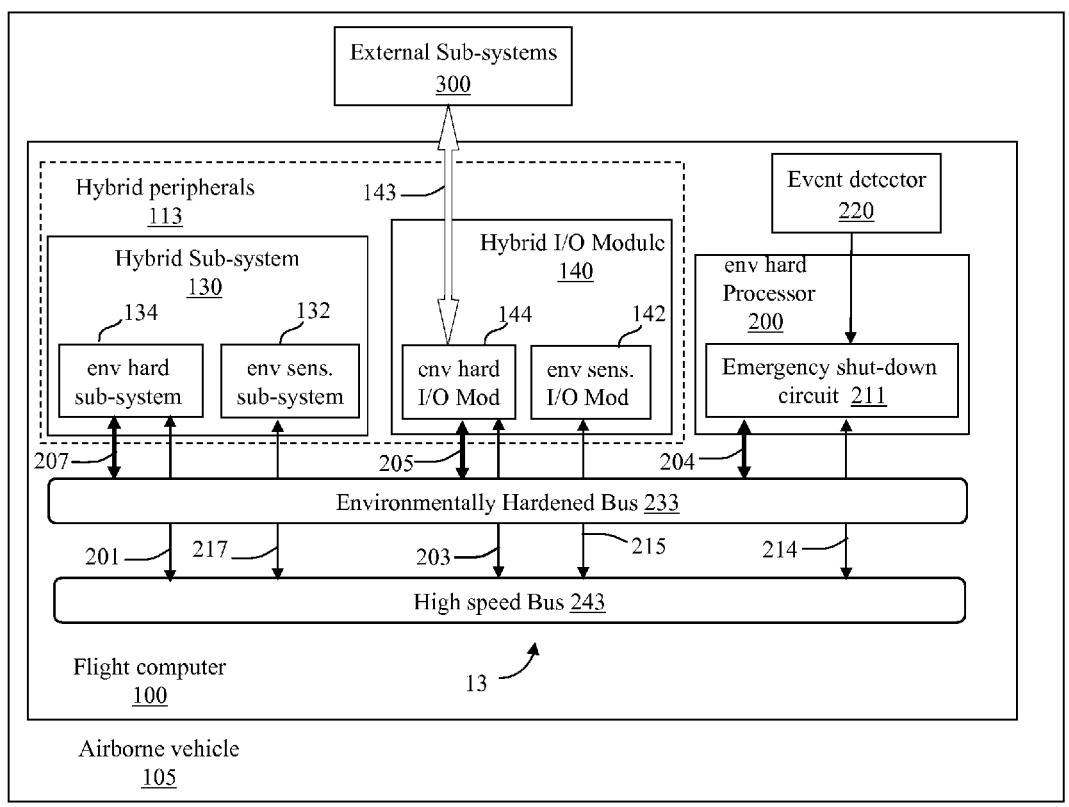

Referring to FIG. 4, an environmentally hardened architecture 13 comprises hybrid peripherals 113, an environmentally hardened bus 233, a high speed bus 243, at least one event detector 220, and the environmentally-hardened processor 200. In the exemplary embodiment shown in FIG. 4, environmentally-hardened processor 200 includes an emergency shut-down circuit 211 in place of the emergency-control circuit 210. As shown in FIG. 4, the hybrid peripherals 113 include at least one hybrid subsystem 130 and at least one hybrid input/output module 140. Each of the environmentally-hardened input/output modules 144 is communicatively coupled to external sub-systems 300 via interface 143. The environmentally hardened architecture 13 is implemented in a flight computer 100 of an airborne vehicle 105.

The high speed bus 243 includes environmentally-sensitive interfaces 201, 203, 214, 215 and 217. The environmentally hardened bus 233 includes environmentally-hardened interfaces 204, 205, and 207. The environmentally hardened bus 233 and the high speed bus 243 function in a manner similar to the environmentally hardened bus 230 and the high speed bus 240, respectively, as described above with reference to FIG. 1. The environmentally-hardened processor 200, the environmentally-sensitive interfaces 201, 203, 214, 215 and 217, and the environmentally-hardened interfaces 204, 205, and 207 each function as described above with reference to FIG. 1.

In implementations of this embodiment, the hybrid input/output module 140 includes one or more hybrid processors and/or one or more hybrid sub-systems. In another implementation of this embodiment, the hybrid sub-system 130 includes one or more hybrid processors and/or one or more hybrid input/output modules.

Figure 5:
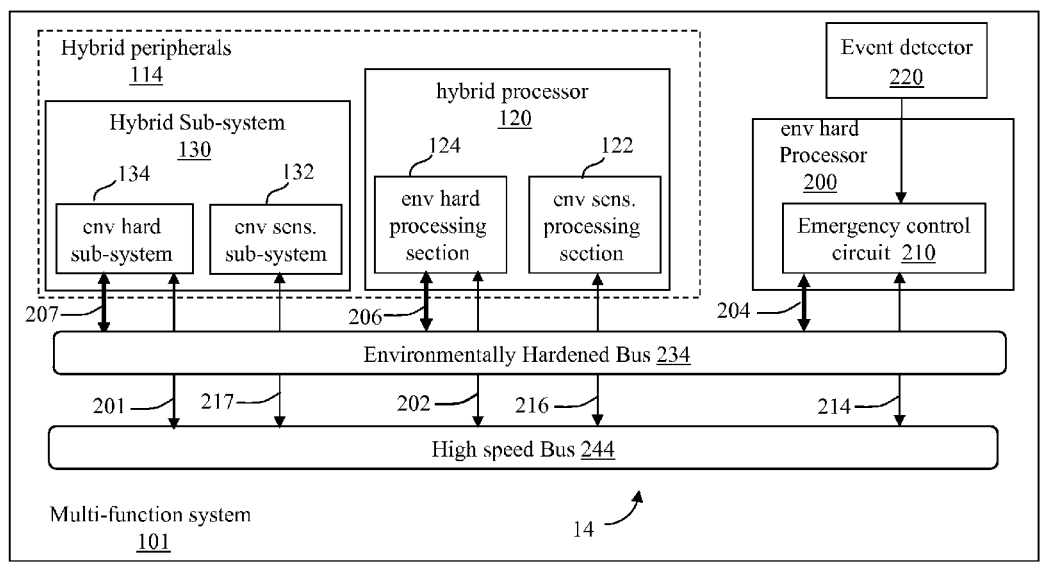
FIG. 5 is a block diagram of one embodiment of a multi-function system having an environmentally hardened architecture.

Referring to FIG. 5, an environmentally hardened architecture 14 comprises hybrid peripherals 114, an environmentally hardened bus 234, a high speed bus 244, at least one event detector 220, and the environmentally-hardened processor 200. In the exemplary embodiment shown in FIG. 5, the hybrid peripherals 114 include at least one hybrid processor 120, and at least one hybrid sub-system 130. The environmentally hardened architecture 14 is implemented in a multi-function system 101. In one implementation of this embodiment, the environmentally hardened architecture 14 is implemented in a flight computer of an airborne vehicle.

The high speed bus 244 includes environmentally-sensitive interfaces 201, 202, 214, 216, and 217. The environmentally hardened bus 234 includes environmentally-hardened interfaces 204, 206, and 207. The environmentally hardened bus 234 and the high speed bus 244 function in a manner similar to the environmentally hardened bus 230 and the high speed bus 240, respectively, as described above with reference to FIG. 1. The environmentally-hardened processor 200, the environmentally-sensitive interfaces 201, 202, 214, 216, and 217, and the environmentally-hardened interfaces 204, 206, and 207 each function as described above with reference to FIG. 1.

In implementations of this embodiment, the hybrid processor 120 includes one or more hybrid input/output modules and/or one or more hybrid sub-systems. In another implementation of this embodiment, the hybrid sub-system 130 includes one or more hybrid processors and/or one or more hybrid input/output modules.

Figure 6:
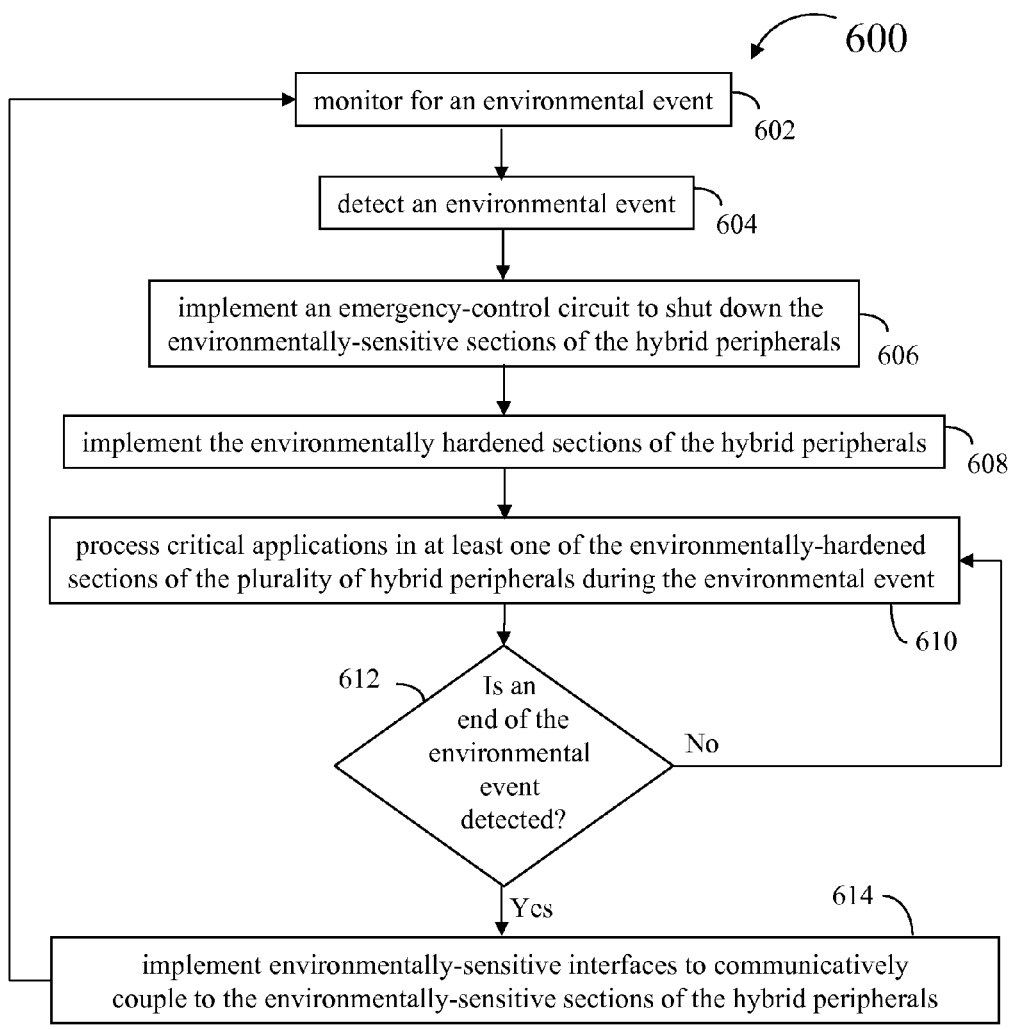
FIG. 6 is a flow diagram of one embodiment of a method to operating a multi-function system having sections sensitive to environmental events and sections hardened to the environmental events.

FIG. 6 is a flow diagram of one embodiment of a method 600 to operate a multi-function system having sections sensitive to environmental events and sections hardened to the environmental events. In one implementation of this embodiment, the method 600 is a method of operating the flight computer 100 which has hybrid peripherals 110 having sections sensitive to environmental events and sections hardened to the environmental events.

At block 602, the multi-function system monitors for an environmental event. At block 604, the event detector detects the environmental event. At block 606, the environmentally-hardened processor implements an emergency-control circuit to control the environmentally-sensitive sections of the hybrid peripherals responsive to detecting the environmental event. The event detector sends information indicative of the environmental event to the environmentally-hardened processor and the environmentally-hardened processor sends a signal to the emergency-control circuit to control the environmentally-sensitive sections of the hybrid peripherals. In one implementation of this embodiment, the event detector sends information indicative of the environmental event to the emergency-control circuit in the environmentally-hardened processor.

The environmentally-hardened processor implements the emergency-control circuit to control the environmentally-sensitive sections of the hybrid peripherals by reducing power to at least a portion of the environmentally-sensitive processing sections of the hybrid peripherals and/or by shutting down at least a portion of the environmentally-sensitive processing sections of the hybrid peripherals.

At block 608, the environmentally-hardened processor implements the environmentally hardened sections of the hybrid peripherals. At block 610, the environmentally-hardened processor processes critical applications in at least one of the environmentally-hardened sections of the plurality of hybrid peripherals during the environmental event. Details that describe how the environmentally-hardened processor processes critical applications in the environmentally-hardened sections of the hybrid peripherals are provided below with reference to FIG. 7.

At block 612, the environmentally-hardened processor determines if an end of the environmental event is detected. At the end of an environmental event, the event detector sends information indicative of an end of the environmental event to the environmentally-hardened processor. If the end of the environmental event has not been detected at block 612, the flow proceeds to block 610 and the environmentally-hardened processor continues to process critical applications in the hybrid peripherals. If the end of the environmental event has been detected, the flow proceeds to block 614. At block 614, after the detection of the end of the event, the environmentally-hardened processor implements the environmentally-sensitive interfaces to communicatively couple the environmentally-sensitive sections of the hybrid peripherals to each other and to the environmentally-hardened processor.

In an exemplary embodiment, method 600 is implemented by the flight computer 100 having an environmentally-hardened architecture 10 as shown in FIG. 1. In this case, the flight computer 100 monitors for an environmental event at the event detector 220. If the event detector 220 detects the environmental event, the event detector 220 sends information indicative of the environmental event to the environmentally-hardened processor 200. The environmentally-hardened processor 200 implements the emergency-control circuit 210 to control (that is, to reduce power to and/or shut down at least portions of) the environmentally-sensitive sections 122, 132, and 142 of the hybrid peripherals 110. The environmentally-hardened processor 200 also implements the environmentally hardened sections 124, 134, and 144 of the hybrid peripherals 100. The environmentally-hardened processor 200 processes critical applications in at least one of the environmentally-hardened sections 124, 134, and 144 of the plurality of hybrid peripherals 110 for the duration of the environmental event via the environmentally-hardened interfaces 204-207.

When the event detector 220 detects the end of the environmental event, the event detector 220 sends information indicative of an end of the environmental event to the environmentally-hardened processor 200. Then, the environmentally-hardened processor 200 implements the environmentally-sensitive interfaces 201-203 and 214-217 of the hybrid peripherals 110 to communicatively couple the environmentally-sensitive sections 122, 132, and 142 of the hybrid peripherals 110 to the environmentally-hardened processor 200 and to each other. Signals including information indicative of controls, reads, and writes are transmitted via the high speed bus 241 among the hybrid sub-system 130, the hybrid processor 120, and the hybrid input/output module 140 via the environmentally-sensitive interfaces 201-203 and 214-217. In this manner, the critical functions of the flight computer 100 are maintained and the environmentally-sensitive sections 122, 132, and 142 of the hybrid peripherals 110 are protected during the environmental event. Other embodiments of implementing method 600 are possible. For example, method 600 can be implemented by the flight computer 100 having an environmentally-hardened architecture 11 as shown in FIG. 2, by the flight computer 100 having an environmentally-hardened architecture 12 as shown in FIG. 3, by the flight computer 100 having an environmentally-hardened architecture 13 as shown in FIG. 4, or by the multi-function system 101 having an environmentally-hardened architecture 14 as shown in FIG. 5.

In one implementation of this embodiment of method 600, detecting an environmental event comprises detecting a radiation event. In this case, the radiation-hardened processor 200 implements the emergency-control circuit 210 to control radiation-sensitive regions 122, 132, and 142 of the hybrid peripherals 110 responsive to detecting the radiation event and the radiation-hardened processor 200 also implements radiation hardened sections 134, 124, 144 of the hybrid peripherals 110 communicatively coupled to a radiation hardened bus 230 via at least one radiation-hardened interface 207, 206, and 205.

Figure 7:
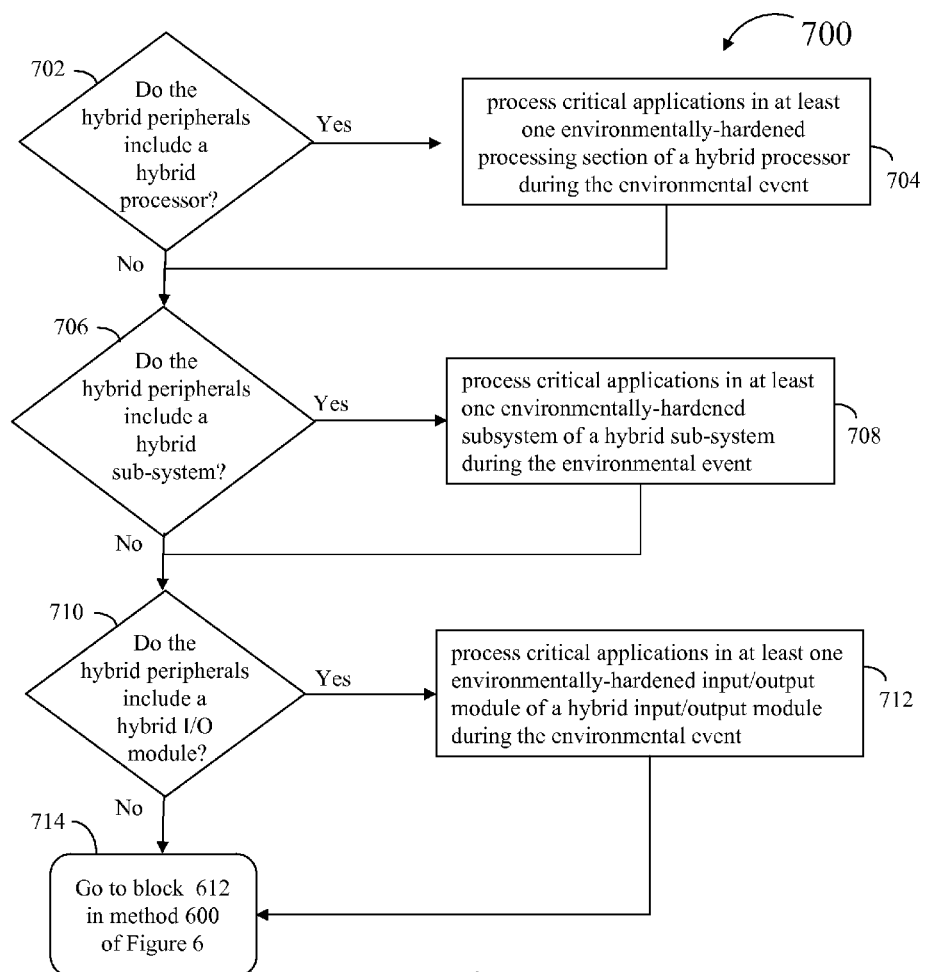
FIG. 7 is a flow diagram of one embodiment of a method to process critical applications in at least one environmentally-hardened section of a plurality of hybrid peripherals during an environmental event.

FIG. 7 is a flow diagram of one embodiment of a method 700 to process critical applications in at least one environmentally-hardened section of a plurality of hybrid peripherals during an environmental event. As described above with reference to block 610 of method 600 in FIG. 6, method 700 is implemented as one step in the method to operate a multi-function system having sections sensitive to environmental events and sections hardened to the environmental events.

At block 702, the environmentally-hardened processor determines if the hybrid peripherals in the multi-function system includes a hybrid processor. If the hybrid peripherals in the multi-function system include a hybrid processor, the flow proceeds to block 704. At block 704, the environmentally-hardened processor processes critical applications in at least one environmentally-hardened processing section of a hybrid processor during the environmental event and the flow proceeds to block 706. If the hybrid peripherals in the multi-function system do not include a hybrid processor, the flow proceeds from block 702 to block 706.

At block 706, the environmentally-hardened processor determines if the hybrid peripherals in the multi-function system include a hybrid sub-system. If the hybrid peripherals in the multi-function system include a hybrid sub-system, the flow proceeds to block 708. At block 708, the environmentally-hardened processor processes critical applications in at least one environmentally-hardened sub-system of a hybrid sub-system during the environmental event and the flow proceeds to block 710. If the hybrid peripherals in the multi-function system do not include a hybrid sub-system, the flow proceeds from block 706 to block 710.

At block 710, the environmentally-hardened processor determines if the hybrid peripherals in the multi-function system include a hybrid input/output module. If the hybrid peripherals in the multi-function system include a hybrid input/output module, the flow proceeds to block 712. At block 712, the environmentally-hardened processor processes critical applications in at least one environmentally-hardened input/output module 144 of a hybrid input/output module 140 during the environmental event and the flow proceeds to block 714. If the hybrid peripherals in the multi-function system do not include a hybrid input/output module, the flow proceeds to block 714. At block 714, the flow proceeds to block 612 in method 600 as described above with reference to FIG. 6.

In an exemplary embodiment, method 700 is implemented by the flight computer 100 having an environmentally-hardened architecture 10 as shown in FIG. 1. In this case, the environmentally-hardened processor 200 in the flight computer 100 determines the hybrid peripherals 110 in the flight computer 100 include a hybrid processor 120. The environmentally-hardened processor 200 processes critical applications in at least one environmentally-hardened processing section 124 of the hybrid processor 120 during the environmental event. The environmentally-hardened processor 200 also determines the hybrid peripherals 110 in the flight computer 100 include a hybrid sub-system 130. The environmentally-hardened processor 200 processes critical applications in the environmentally-hardened sub-system 134 of the hybrid sub-system 130 during the environmental event. The environmentally-hardened processor 200 also determines the hybrid peripherals 110 in the flight computer 100 include a hybrid input/output module 140. The environmentally-hardened processor 200 processes critical applications in at least one environmentally-hardened input/output module 144 of the hybrid input/output module 140 during the environmental event.

In another exemplary embodiment, method 700 is implemented by the flight computer 100 having an environmentally-hardened architecture 13 as shown in FIG. 4. The environmentally-hardened processor 200 in the flight computer 100 determines the hybrid peripherals 113 in the flight computer 100 do not include a hybrid processor 120. However, the environmentally-hardened processor 200 determines the hybrid peripherals 113 in the flight computer 100 include a hybrid sub-system 130. The environmentally-hardened processor 200 processes critical applications in the environmentally-hardened sub-system 134 of the hybrid sub-system 130 during the environmental event. The environmentally-hardened processor 200 also determines the hybrid peripherals 113 in the flight computer 100 include a hybrid input/output module 140. The environmentally-hardened processor 200 processes critical applications in at least one environmentally-hardened input/output module 144 of the hybrid input/output module 140 during the environmental event. Other embodiments are possible.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An environmentally hardened architecture comprising:
   at least one hybrid processor including an environmentally-hardened processing section and an environmentally-sensitive processing section;
   a high speed bus having environmentally-sensitive interfaces, at least one environmentally-sensitive interface configured to pass data to and from the environmentally-sensitive processing section of the at least one hybrid processor and at least one environmentally-sensitive interface configured to pass data to and from the environmentally-hardened processing section of the at least one hybrid processor;
   an environmentally hardened bus having environmentally-hardened interfaces, at least one environmentally-hardened interface configured to pass data to and from the environmentally-hardened processing section of the at least one hybrid processor; and
   an environmentally-hardened processor communicatively coupled to at least one environmentally-sensitive interface of the high speed bus and communicatively coupled to at least one environmentally-hardened interface of the environmentally hardened bus, wherein the environmentally-hardened processor is configured to process critical applications in the environmentally-hardened processing section of the at least one hybrid processor during an environmental event.

2. The environmentally hardened architecture of claim 1, further comprising:
   at least one event detector configured to detect environmental events and configured to send information indicative of an environmental event to the environmentally-hardened processor; and
   an emergency-control circuit in the environmentally-hardened processor to receive an emergency-control signal responsive to the detection of an environmental event, the emergency-control circuit operable to control the environmentally-sensitive processing section responsive to receiving the emergency-control signal, wherein the environmentally-sensitive processing section is controlled by at least one of reducing power to at least a portion of the environmentally-sensitive processing section, shutting down at least a portion of the environmentally-sensitive processing section, and a combination thereof.

3. The environmentally hardened architecture of claim 1, further comprising:
   at least one hybrid sub-system including an environmentally-hardened sub-system and an environmentally-sensitive sub-system,
   wherein the high speed bus further comprises at least one environmentally-sensitive interface configured to pass data to and from the at least one environmentally-sensitive sub-system and at least one environmentally-sensitive interface configured to pass data to and from the at least one environmentally-hardened sub-system, wherein the environmentally hardened bus further comprises at least one environmentally-hardened interface configured to pass data to and from the environmentally-hardened sub-system, and wherein the environmentally-hardened processor is further configured to process critical applications in the environmentally-hardened sub-system of the at least one hybrid sub-system during an environmental event.

4. The environmentally hardened architecture of claim 3, further comprising:
   at least one event detector configured to detect environmental events and configured to send information indicative of an environmental event to the environmentally-hardened processor; and
   an emergency-control circuit in the environmentally-hardened processor to receive an emergency-control signal responsive to the detection of an environmental event, the emergency-control circuit operable to control the environmentally-sensitive sub-system, and the environmentally-sensitive processing section responsive to receiving the emergency-control signal, wherein the environmentally-sensitive processing section and the environmentally-sensitive sub-system are controlled by at least one of reducing power to at least a portion of the environmentally-sensitive processing section, shutting down at least a portion of the environmentally-sensitive processing section, reducing power to at least a portion of the environmentally-sensitive sub-system, shutting down at least a portion of the environmentally-sensitive sub-system, and combinations thereof.

5. The environmentally hardened architecture of claim 3, further comprising:
   at least one hybrid input/output module including an environmentally-hardened input/output module and an environmentally-sensitive input/output module;

at least one event detector configured to detect environmental events and configured to send information indicative of an environmental event to the environmentally-hardened processor; and an emergency-control circuit in the environmentally-hardened processor to receive an emergency-control signal responsive to the detection of an environmental event, the emergency-control circuit operable to control the environmentally-sensitive input/output module, the environmentally-sensitive sub-system, and the environmentally-sensitive processing section responsive to receiving the emergency-control signal, wherein the environmentally-sensitive input/output module, the environmentally-sensitive processing section and the environmentally-sensitive sub-system are controlled by at least one of reducing power to at least one environmentally-sensitive input/output module, shutting down at least one environmentally-sensitive input/output module, reducing power to at least a portion of the environmentally-sensitive processing section, shutting down at least a portion of the environmentally-sensitive processing section, reducing power to at least a portion of the environmentally-sensitive sub-system, shutting down at least a portion of the environmentally-sensitive sub-system, and combinations thereof, wherein the high speed bus further comprises at least one environmentally-sensitive interface configured to pass data to and from the at least one environmentally-sensitive input/output module and at least one environmentally-sensitive interface configured to pass data to and from the at least one environmentally-hardened input/output module, wherein the environmentally hardened bus further comprises at least one environmentally-hardened interface configured to pass data to and from the environmentally-hardened input/output module, and wherein the environmentally-hardened processor is further configured to process critical applications in the environmentally-hardened input/output module of the at least one hybrid input/output module during an environmental event, and wherein the environmentally-hardened input/output module is communicatively coupled to external sub-systems.

6. The environmentally hardened architecture of claim 5, wherein the at least one of the least one hybrid input/output module, the at least one hybrid sub-system, and the at least one hybrid processor is integrated with at least one of another of the least one hybrid input/output module, the at least one hybrid sub-system, and the at least one hybrid processor.

7. The environmentally hardened architecture of claim 5, wherein the at least one hybrid processor, the at least one hybrid input/output module, and the at least one hybrid sub-system comprise hybrid peripherals in a flight computer for an airborne vehicle.

8. The environmentally hardened architecture of claim 1, further comprising:
at least one hybrid input/output module including an environmentally-hardened input/output module and an environmentally-sensitive input/output module,
wherein the high speed bus further comprises at least one environmentally-sensitive interface configured to pass data to and from the at least one environmentally-sensitive input/output module and at least one environmentally-sensitive interface configured to pass data to and from the at least one environmentally-hardened input/output module, wherein the environmentally hardened bus further comprises at least one environmentally-hardened interface configured to pass data to and from the environmentally-hardened input/output module, and wherein the environmentally-hardened processor is further configured to process critical applications in the environmentally-hardened input/output module of the at least one hybrid input/output module during an environmental event, and wherein the environmentally-hardened input/output module is communicatively coupled to external sub-systems.

9. The environmentally hardened architecture of claim 8, further comprising:
at least one event detector configured to detect environmental events and configured to send information indicative of an environmental event to the environmentally-hardened processor; and
an emergency-control circuit in the environmentally-hardened processor to receive an emergency-control signal responsive to the detection of an environmental event, the emergency-control circuit operable to control the environmentally-sensitive input/output module, and the environmentally-sensitive processing section responsive to receiving the emergency-control signal, wherein the environmentally-sensitive processing section is controlled by at least one of reducing power to at least a portion of the environmentally-sensitive processing section, shutting down at least a portion of the environmentally-sensitive processing section, reducing power to at least a portion of the environmentally-sensitive input/output module, shutting down at least a portion of the environmentally-sensitive input/output module, and combinations thereof.

10. The environmentally hardened architecture of claim 1, wherein the at least one hybrid processor comprises one of at least one hybrid sub-system, and at least one hybrid input/output module, and a combination thereof.

11. A method of operating a multi-function system having a plurality of hybrid peripherals having sections sensitive to environmental events and sections hardened to the environmental events, the method comprising:
detecting the environmental event;
implementing an emergency-control circuit to control the environmentally-sensitive sections of the hybrid peripherals responsive to detecting the environmental event;
implementing the environmentally hardened sections of the hybrid peripherals;
detecting an end of the environmental event; and
implementing environmentally-sensitive interfaces to communicatively couple the environmentally-sensitive sections of the hybrid peripherals to the environmentally-hardened processor after the detection of the end of the event.

12. The method of claim 11, the method further comprising:
processing critical applications in at least one of the environmentally-hardened sections of the plurality of hybrid peripherals during the environmental event.

13. The method of claim 12, wherein processing critical applications in at least one of the environmentally-hardened sections of the plurality of hybrid peripherals during the environmental event comprises:
processing critical applications in at least one environmentally-hardened processing section of a hybrid processor during the environmental event.

14. The method of claim 12, wherein processing critical applications in at least one of the environmentally-hardened sections of the plurality of hybrid peripherals during the environmental event comprises:

processing critical applications in at least one environmentally-hardened subsystem of a hybrid sub-system during the environmental event.

15. The method of claim 12, wherein processing critical applications in at least one of the environmentally-hardened sections of the plurality of hybrid peripherals during the environmental event comprises:
processing critical applications in at least one environmentally-hardened input/output module of a hybrid input/output module during the environmental event.

16. The method of claim 11, wherein detecting an environmental event comprises:
detecting a radiation event, and wherein implementing an emergency-control circuit to control environmentally-sensitive regions of the hybrid peripherals comprises:
implementing an emergency-control circuit to control radiation-sensitive regions of the hybrid peripherals responsive to detecting the radiation event,
wherein implementing environmentally hardened sections of the hybrid peripherals communicatively coupled to an environmentally hardened bus via at least one environmentally-hardened interface comprises:
implementing radiation hardened sections of the hybrid peripherals communicatively coupled to a radiation hardened bus via at least one radiation-hardened interface.

17. An environmentally protected flight computer comprising:
at least one hybrid peripheral including an environmentally-hardened section and an environmentally-sensitive section;
a high speed bus having environmentally-sensitive interfaces, at least one environmentally-sensitive interface configured to pass data to and from the environmentally-sensitive processing section of the at least one hybrid peripheral and at least one environmentally-sensitive interface configured to pass data to and from the environmentally-hardened processing section of the at least one hybrid peripheral;
an environmentally hardened bus having environmentally-hardened interfaces, at least one environmentally-hardened interface configured to pass data to and from the environmentally-hardened section of the at least one hybrid peripheral;
an environmentally-hardened processor communicatively coupled to at least one environmentally-sensitive interface of the high speed bus, and communicatively coupled to at least one environmentally-hardened interface of the environmentally hardened bus, wherein the environmentally-hardened processor is configured to process flight critical applications in the environmentally-hardened section of the at least one hybrid peripheral during an environmental event.

18. The environmentally protected flight computer of claim 17, the environmentally protected flight computer further comprising:
at least one event detector configured to detect environmental events and configured to send information indicative of an environmental event to the environmentally-hardened processor.

19. The environmentally protected flight computer of claim 18, the environmentally protected flight computer further comprising:
an emergency-control circuit in the environmentally-hardened processor to receive an emergency-control signal responsive to the detection of an environmental event, the emergency-control circuit operable to control the environmentally-sensitive sections of the at least one hybrid peripheral responsive to receiving the emergency-control signal.

20. The environmentally protected flight computer of claim 17, wherein the at least one hybrid peripheral comprises one of at least one hybrid processor, at least one hybrid sub-system, at least one hybrid input/output module, and combinations thereof.

* * * * *